US009920843B2

(12) United States Patent
Lildholdt et al.

(10) Patent No.: US 9,920,843 B2
(45) Date of Patent: Mar. 20, 2018

(54) SPRING GASKET FOR A VALVE HOUSING (71) Applicant: BROEN A/S, Assens (DK)

(72) Inventors: Mads Lindegaard Lildholdt, Haarby (DK); Karin Birthe Lindegaard Lildholdt, Haarby (DK); Peder Madsen, Odense SV (DK)

(73) Assignee: BROEN A/S, Assens (DK)

( * ) Notice: Subject to any disclaimer, the term of this patent is extended or adjusted under 35 U.S.C. 154(b) by 39 days.

(21) Appl. No.: 14/900,291

(22) PCT Filed: Jun. 19, 2014

(86) PCT No.: PCT/DK2014/050177
§ 371 (c)(1),
(2) Date: Dec. 21, 2015

(87) PCT Pub. No.: WO2014/202093
PCT Pub. Date: Dec. 24, 2014

(65) Prior Publication Data
US 2016/0298776 A1    Oct. 13, 2016

(30) Foreign Application Priority Data

Jun. 20, 2013 (DK) ................................ 2013 70335

(51) Int. Cl.
*F16K 5/06* (2006.01)
(52) U.S. Cl.
CPC .................................. *F16K 5/0689* (2013.01)
(58) Field of Classification Search
CPC .... F16K 5/0689; F16K 5/0657; F16K 5/0663; F16K 5/0668; F16K 5/0673; F16K 5/0678

(Continued)

(56) References Cited

U.S. PATENT DOCUMENTS 2,573,177 A    10/1951  Bohlen
3,394,915 A     7/1968  Gachot
(Continued)

FOREIGN PATENT DOCUMENTS

DE    1 675 412 A1   12/1970
DE    2 312 839 A1    9/1974
(Continued)

OTHER PUBLICATIONS

Corresponding Supplementary European Search Report for Application No. EP 14 81 4512 dated Sep. 21, 2016.

*Primary Examiner* — Ian Paquette
(74) *Attorney, Agent, or Firm* — David S. Safran (57) ABSTRACT

A valve and a method for producing a valve for regulating a fluid, having a valve housing with a central part and with two connection ends, the connection ends extending away from the central part, wherein internally of the central part there is arranged a valve body including at least a shutoff part and a through-flow part. The valve seat is arranged in the valve housing and resiliently bears against the valve body, a resilient structural part has a spring action that acts in a direction substantially parallel with the flow direction of the valve and has at least one annular flange part adapted for bearing on the valve body. The resilient valve seat includes a fixing member for mechanical fixing of the valve seat in the valve housing. The fixing member has a flange part fixed in the valve housing by plastic deformation.

10 Claims, 4 Drawing Sheets

(58) Field of Classification Search
USPC .................. 251/315.01, 315.1, 315.13, 314
See application file for complete search history.

(56) References Cited

U.S. PATENT DOCUMENTS

| | | | |
|---|---|---|---|
| 4,057,883 A | | 11/1977 | Paptzun et al. |
| 4,126,295 A | * | 11/1978 | Natalizia ................. F16K 5/201 |
| | | | 251/174 |
| 4,147,327 A | * | 4/1979 | Moran ................. F16K 5/0668 |
| | | | 251/172 |
| 4,231,546 A | | 11/1980 | Eggleston et al. |
| 4,546,790 A | | 10/1985 | Huber et al. |
| 4,671,308 A | * | 6/1987 | Williams .............. F16K 5/0626 |
| | | | 137/72 |
| 5,405,228 A | * | 4/1995 | Reid ...................... B23P 9/025 |
| | | | 411/113 |
| 5,904,337 A | | 5/1999 | VanKirk et al. |
| 6,161,569 A | * | 12/2000 | Gonsior ............... F16K 5/0689 |
| | | | 137/375 |
| 8,281,798 B2 | | 10/2012 | Dalluge et al. |
| 8,500,090 B2 | | 8/2013 | Hubacek et al. |
| 2012/0167987 A1 | | 7/2012 | Balan et al. |

FOREIGN PATENT DOCUMENTS

| | | |
|---|---|---|
| EP | 2 280 204 A1 | 2/2011 |
| JP | 2-286981 A | 11/1990 |
| JP | 4-32369 U | 3/1992 |
| WO | 2012/094137 A1 | 7/2012 |

* cited by examiner

SPRING GASKET FOR A VALVE HOUSING

BACKGROUND OF THE INVENTION

Field of the Invention

The present invention concerns a valve for regulating a fluid, wherein the valve includes a valve housing with a central part and with two connection ends, the connection ends extending away from the central part, thus indicating a flow direction for the fluid, wherein internally of the central part there is arranged a valve body including an at least partially spherical surface for bearing against a corresponding valve seat, the valve body including at least a shutoff part and a through-flow part. The invention further includes a method for making such a valve.

Description of Related Art

It is commonly known to make valves, e.g., ball valves, and thereby valve housings of several parts and then assemble these parts around one or two valve seats and a valve body. Such valves are typically made of brass or other cupper-based alloy and are typically assembled by corresponding screw threads in respective parts, or alternatively by means of bolts.

When speaking of a ball valve, the valve body is, as indicated by the name, spherical and typically with an outer size which is greater than the connecting openings in the valve housing. Such a valve therefore has a valve housing with an internal geometry in which valve seat and valve body are disposed. The valve housing is typically joined in the vicinity of the valve body as the latter requires the largest internal dimension.

Such valves are typically made of cast items which are formed and shaped by machining by cutting operation to the desired geometry. This shaping process is, however, rather cost-intensive for several reasons. The individual work pieces are to be cast and then handled and machined one by one in a suitable metal cutting unit. Since the work pieces are individually machined, the process is time-consuming, irrespective of the application of modern and relatively rapid processes.

In addition to the handling and machining of the cast work pieces prior to assembling around one or two valve seats and a valve body, the cost of the material also plays a significant role. Brass or other suitable alloys are expensive, entailing an appreciably greater cost than e.g., common weldable carbon steel.

U.S. Pat. No. 8,500,090 B2 discloses a valve wherein the valve seat includes a resilient structural part where the spring action from the resilient structural part acts in a direction in parallel with the flow direction of the valve, and including an annular flange part adapted for direct or indirect bearing against the valve body. This resilient structural part is placed in a valve housing which is shaped, possibly before mounting one connection end. This implies that the mounting of the resilient structural parts in the central part of the valve housing is impeded, and that the making of the valve therefore can take longer time and entail increased production costs.

Thus, there is an expressed desire for making valves for heating and cooling systems, for potable water and for other purposes in steel, e.g., carbon steel or stainless steel which is cheaper that the common alloys and which can be worked with modern production equipment directly from a plate piece or a tube piece faster and cheaper than possible when casting and machining work pieces of, e.g., brass.

At the same time, it is greatly desired to entirely avoid performing welding processes on a valve as such processes cause respective work pieces to be set up in production at least one more time and the welding process itself is to be performed, which of course raises the cost of the product.

In addition, it is desired to perform a rapid and simple mounting of valve seat as well as valve body while at the same time a high quality and a secure and unambiguous disposition of these parts in relation to the valve housing and to each other are achieved.

SUMMARY OF THE INVENTION

It is the object of the invention to indicate a solution to the above problem wherein a valve is made with a valve housing and with at least one valve seat which is easily and unimpeded can be mounted and fixed together with the valve body, wherein a minimum number of chip removing and cutting processes are performed before mounting a valve seat and a valve body, As mentioned in the introduction, the invention concerns a valve for regulating a fluid, wherein the valve includes a valve housing with a central part and with two connection ends, the connection ends extending away from the central part, thus indicating a flow direction for the fluid, wherein internally of the central part there is arranged a valve body including an at least partially spherical surface for bearing against a corresponding valve seat, the valve body including at least a shutoff part and a through-flow part. The valve seat is arranged in the valve housing and resiliently bearing against the valve body, the valve seat including a resilient structural part where the spring action from the resilient structural part acts in a direction which is substantially in parallel with the flow direction of the valve, and where the resilient structural part includes at least one annular flange part adapted for direct or indirect bearing on the valve body.

A new feature of a valve according to the invention is that it is adapted such that the resilient valve seat or seats include a fixing member for mechanical fixing of the valve seat in a valve housing, the fixing member including means, for example, a flange part, fixed in a valve housing by plastic deformation of the valve housing and/or by plastic deformation of the means.

A preferred method for this purpose is that the valve housing is made of a plastically deformable tubular workpiece, and that the valve seat is fixed herein by deformation of the tubular workpiece. Such a deformation can include locking of a valve seat at a given position as the valve housing is deformed, thereby securing the valve seat in the desired position, but a deformation may also occur of valve housing as well as the mentioned fixing member whereby the same mechanical fixing or locking the valve seat is achieved.

The resilient structural part thus exerts a resilient pressure between the valve housing and the valve body whereby a sealing is achieved between valve body and valve seat, and where it is possible to achieve a sealing between valve housing and valve seat as well, depending on the design of the construction. The resilient action of the valve seat or of its resilient structural part provides that a valve seat can absorb tolerances within a relatively wide range why a greater certainty of the intended operation of the valve can be achieved. This is achieved in that there is an annular flange part which at least partially applies a resilient pressure against the valve body. In that it is a resilient flange that interacts with the valve body, the contact pressure and thereby the friction between valve seat and valve body can more easily be kept at a necessary and at the same time relatively low level. By the prior art solutions with valve seats constituted by solid elastomeric items mounted in the valve housing, it is necessary to ensure and maintain a relatively high pressure between valve seat and valve body, as it is the inherent elasticity of the elastomeric member that absorbs tolerances and ensures a sufficient contact pressure between respective parts, a pressure typically of such magnitude that a relatively high friction is produced between valve seat and valve body. The flange part thus has the advantage of not being an elastic solid item that is compressed but a flange part acting resiliently as its action is applied a projecting annular flange part, a kind of cantilever upon which the packing element in the form of an elastomeric item can be arranged.

A valve according to the invention can include a valve housing with a valve body and with one valve seat arranged in a cutout or recess adapted for the purpose in the valve housing and bearing against the valve body. The valve body can be a more or less traditionally spherical valve body, but it may also be a valve body that only includes part of a spherical shell, thus including at least a spherical subarea on the shutoff part of the valve body corresponding to the shape of the valve seat at the side facing the valve body. By designing the resilient part of the valve seat as a flange part extending more or less radially relative to the valve body or to the passage through the through-flow part of the valve body, there is achieved a suitable contact pressure against the valve body and thereby a suitable but modest friction. The valve may right away be with only one resilient valve seat for bearing against one side of a valve body.

In a variant of a valve according to the invention, the valve can include two oppositely directed, resilient valve seats. Thus there may be arranged one valve seat at either side of, e.g., a spherical valve body in a classic ball valve. In such a case, the two valve seats will each exert a resilient force on the valve body which will contribute to position the valve seat itself in a kind of equilibrium position at which the actions from the two valve seats are the same.

A valve according to the invention can be adapted such that the resilient valve seat or seats include a fixing member for mechanical fixing of the valve seat in a valve housing, the fixing member including means for disposition in a recess or similar in a valve housing. Such a solution may advantageously be used in larger valves with a flow aperture of 50, 100, 200 mm or even larger, but also in smaller valves. By adapting the valve seat with a so-called fixing member which e.g., can be a cylindrical part with radially outward projecting flange part which either constitutes the flange part to bear directly or indirectly on the valve body or a flange part between the cylindrical part and the flange part to bear directly or indirectly on the valve body, it will be possible to dispose the valve seat in a groove, recess or a fit adapted for the purpose in the valve housing, where, e.g., a packing can be provided as well. Such a packing can be arranged between the cylindrical fixing part and a more or less radial flange part on the valve seat on the one hand and on the valve housing itself on the other hand. In the following, an example thereof will be described below.

A valve according to the invention may advantageously be adapted such that the resilient valve seat or seats include a fixing member for mechanical fixing of the valve seat in a valve housing, the fixing member including means, for example a flange part, fixed in a valve housing by plastic deformation of the valve housing and/or by plastic deformation of the means. A preferred method for this purpose is that the valve housing is made of a plastically deformable tubular workpiece, and that the valve seat is fixed herein by deformation of the tubular workpiece. Such a deformation can include locking of a valve seat at a given position as the valve housing is deformed, thereby securing the valve seat in the desired position, but a deformation of valve housing as well as the mentioned fixing member may also occur whereby the same mechanical fixing or locking of the valve seat is achieved.

In a variant of a valve according to the invention, the resilient valve seat or seats can include a fixing member for mechanical fixing of the valve seat in a valve housing, the fixing member including means in the form of a flange part that is conical in a direction which is substantially in parallel with the flow direction, the flange part including an annular part, the said part including an external edge adapted for fixing internally of the valve housing, the edge constituting or comprising a barb for engaging the internal surface of the valve housing as the external diameter of the flange part is greater than the internal diameter of the valve housing at the area in which the valve seat is disposed. When the valve body and one or two valve seats are mounted in the valve housing it is thus not required with a further fixing as the conical flange part so to say is cutting into the internal surface of the valve housing, thereby locking the valve seat in its final position. In principle is used the same technique as known from the so-called spring-lock disks and which is also used in, e.g., push-in fittings for compressed air and for other purposes. Here, it is just so that the resilient and locking element is provided internally and not externally of the object to be fixed.

In a valve according to the invention, the valve seat can be made of resilient metal, e.g., stainless steel or other suitable alloy, wherein at least part of the valve seat, e.g., the resilient structural part in the form of an annular flange part, is coated with a relatively thin elastomeric surface, e.g., PTFE or other suitable type of elastomer with suitable coefficient of friction and sealing action. By such a solution there is thus direct contact between the annular flange part and the valve body. The sealing effect can appear between valve seat and valve body, but also between the edge of the valve seat engaging or bearing on the valve housing, irrespectively of the valve seat being fixed by resilient locking or by deformation of valve housing and/or valve seat.

In a variant of a valve according to the invention, the valve seat can be made of resilient metal, e.g., stainless steel or other suitable alloy, wherein at least part of the valve seat, e.g., the resilient structural part in the form of an annular flange part, includes a contact surface for an elastomeric packing, e.g., a ring of PTFE or other suitable type of elastomer with suitable coefficient of friction and sealing action. By such a variant, the annular flange part can be with a recess or cutout in which an annular elastomeric packing is arranged, thus causing the flange part to bear directly against the valve body. The resilient structural part is thus one member whereas the packing part itself is constituted by a second member arranged on or in the annular flange part. In the following such a solution will be described below.

The valve body can also be coated with a surface coating, e.g., an elastomer in the form of PTFE or other suitable elastomer, and valve body as well as valve seat can be provided with such suitable coating in addition to the valve body being provided with a suitable sealing or low friction coating that interacts with a packing member arranged on or in an annular flange part.

Yet a variant of a valve according to the invention can include that the valve seat includes a tubular flange part with internal cross-sectional area, the tubular flange part extending away from the valve body and towards a connection end, where the internal cross-sectional area substantially corresponds to the internal cross-sectional area of the through-going opening in the valve housing. In a particularly preferred embodiment, the tubular flange part extends from the flange part bearing against the valve body or from a recess on a flange part for a valve seat packing. The main purpose of the tubular flange part is to guide the medium for which the valve is intended. By having a tubular flange a more controlled flow of medium is ensured before and/or after a valve body where typically there will be a jump in diameters. The tubular flange part acts as a kind of skirt that guides the medium.

Irrespective of the type of the mentioned valve seats applied, they can advantageously be mounted by or in glue. The glue is typically applied internally of the valve housing, and the valve seat is mounted subsequently; alternatively the glue can be applied the valve seat prior to mounting the latter. The glue will ensure that the valve seat is retained at the desired position both during the continued shaping of the valve and during the subsequent use of the valve, and the glue will also ensure a sealing between the valve housing and the external periphery of the valve seat as small scratches or irregularities in the internal surface of the valve housing and on the periphery of the valve seat are filled by the glue.

In a preferred variant of a valve according to the invention, the valve body and at least one valve seat can be fixed in a valve housing, the valve housing having two connection ends, each with a diameter such that at least one connection end has a diameter substantially corresponding to the diameter of either the valve body or of a valve seat. The valve body and the valve seat can hereby be mounted internally of the valve housing via its connection end, and there is no need for making the valve housing in several parts in order to assemble these around valve body and/or valve seats.

The invention furthermore concerns a method for making a valve as mentioned above, wherein the valve is adapted for regulating a fluid, the valve including a valve housing with a central part and with two connection ends, the connection ends extending away from the central part, thus indicating a flow direction for the fluid, wherein internally of the central part there is arranged a valve body including an at least partially spherical surface for bearing against a corresponding valve seat, the valve body including at least a shutoff part and a through-flow part, wherein making of the valve at least includes the following steps:
  providing a valve housing with a central part;
  arranging a valve body in the central part;
  arranging and fixing at least one valve seat in the central part and bearing against the valve body.

A method according to the invention may in a variant at least include the following additional steps:
  fixing of the at least one valve seat is effected by deformation of the valve housing, the deformation being made after arranging the valve seat in the central part.

A further method according to the invention may at least include the following additional steps:
  fixing of the at least one valve seat is effected by deformation of at least one flange part of the valve seat.

By the mentioned methods, a valve according to the invention can be mounted, and the valve body as well as one or two valve seats can be fixed in a simple and rapid way via one or both connection ends of the valve housing. Whether fixing a valve seat by deformation of valve housing and possibly also by a fixing member on the valve seat, or whether fixing occurs by the valve seat via a fixing member exerting a resilient force against the internal side of the valve housing, a rapid and easy mounting of respective parts in relation to each other takes place.

Examples of how a valve according to the invention can look like will be shown in the following.

By this method, the valve can be made of e.g., untreated steel in a series of contiguous and automated processes, and before or after mounting the production can end with a surface finishing. Such a valve and method for producing a valve is very advantageous as the process is simple and takes place in a straightforward sequence.

In a preferred variant of the invention, the valve housing can, however, advantageously be made of, e.g., a carbon steel which already has been applied a surface coating of zinc or other suitable coating. For example, a steel tube galvanized by a suitable galvanizing process can be used. Hereby is achieved the obvious advantage that the surface treatment is performed before working the valve housing into its final geometric shape, entailing a lower production cost of the finished product.

A valve including a valve housing according to the invention is typically designed such that the connection ends have an inner diameter which substantially corresponds to the inner diameter of the valve body. This is therefore a so-called full-flow valve which advantageously can be used in many places where there is a need for a more unhindered flow in the medium flowing through the valve. The connection ends on the valve housing can be designed according to need and can be with male ends or female ends and include all thinkable types of couplings for connecting pipes or hoses, including couplings of the press-fitting type and flanges for bolt assemblies or for a suitable assembly fitting.

At the time being, thin-walled materials gain a foothold in the industry and are increasingly applied to industrial solutions as well as to plumbing installations in residential buildings. There are innumerable advantages connected with thin-walled pipes and fittings and the jointing methods are very simple, why time-consuming and cost-raising work of threading, welding or soldering is avoided.

A valve housing according to the invention can advantageously be made of thin-walled material, such as untreated or surface treated carbon steel or stainless steel, where the valve housing is formed by plastic deformation of the material, e.g., by hydraulic shaping or by axial shaping or by another suitable process. Particularly, hydraulic shaping and axial shaping have appeared to be very well suited for making a valve housing as such processes are rapid and cheap compared with traditional production methods for valve housings, which are typically made of sintered, cast or forged brass or other suitable material which is machined afterwards and fitted with a valve insert. Furthermore, hydraulic shaping and axial shaping are very accurate shaping methods and good tolerances can be attained.

The invention is described in the following with reference to the drawing, wherein.

BRIEF DESCRIPTION OF THE DRAWINGS

DETAILED DESCRIPTION OF THE INVENTION

Figure 1:
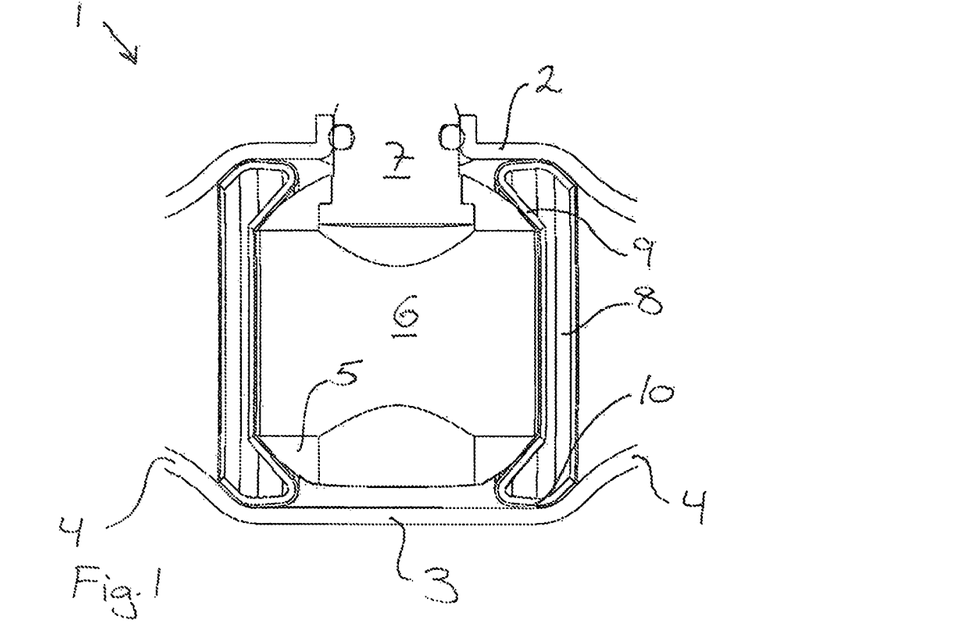
FIG. 1 shows a sectional drawing of a valve with deformed connection ends.

In FIG. 1, a part of a valve 1 is shown in cross-section where a valve housing 2 comprises a central part 3 and two connection ends 4. In the central part 3 is arranged a valve body 5 with a through-going aperture 6. The valve body 5 is connected with a valve spindle 7 and is supported and fixed by two valve seats 8. In the shown variant, the valve seats 8 are fixed in that the two connection ends 4 are deformed into a smaller internal cross-section whereby the valve seats 8 are locked in their positions in relation to the valve body 5 as well as to the valve housing 2. As it appears from the Figure, the valve seat 8 has a flange part 9 bearing against the valve body 5 and a flange part 10 bearing against the internal side of the valve housing 2. The flange part 9 bearing against the valve body 5 exerts a resilient action on the valve body 5 whereby a sealing is achieved between these parts. In that the valve seat 8 is made and mounted as shown here, the pressure exerted by a fluid by closed valve 1 can also act on the back side of the flange part 9, whereby the flange part 9 is pressed against the valve body 5, entailing an even more optimal sealing between the two items 5, 9.

Figure 2:
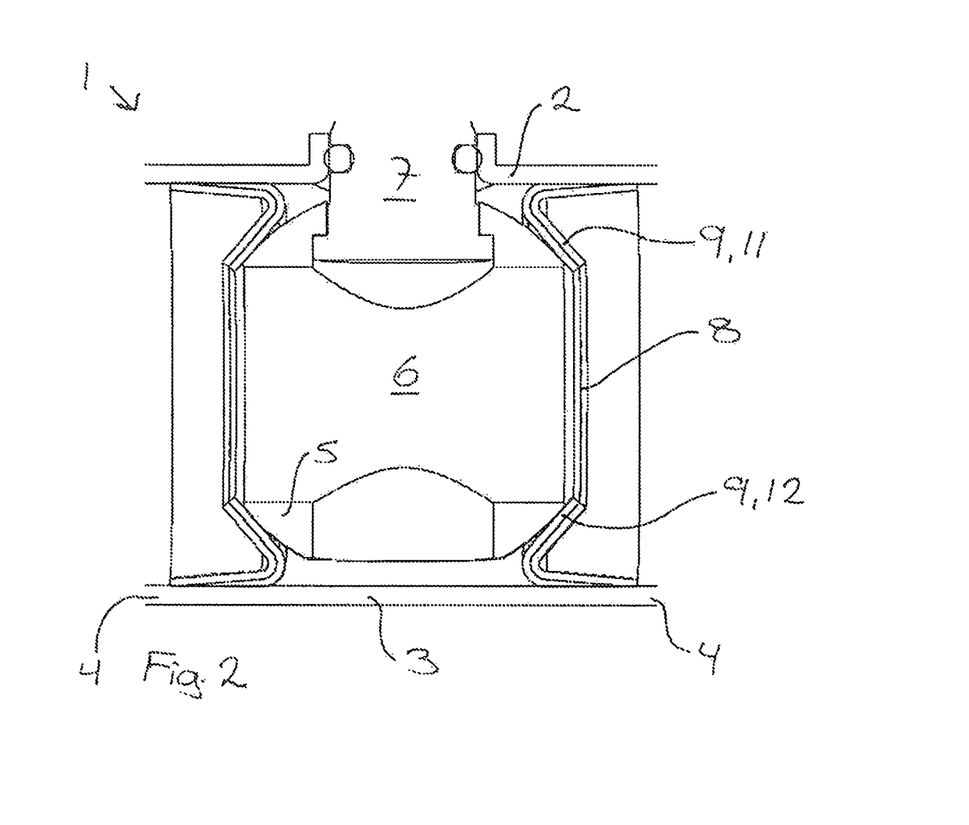
FIG. 2 shows a sectional drawing of a valve with spring-locked valve seats.

FIG. 2 also shows a valve housing 2 with a central part 3 with connection ends 4 and with a valve body 5 arranged between two valve seats 8. The difference between this figure and FIG. 1 is that the valve seats 8 are only fixed by the flange part 10 being pressed against the internal side of the valve housing 2, where a locking occurs according to the same principle as by the various known push-in fittings, wherein a kind of resilient locking ring engages as a barb with—in this case—the internal surface of the valve housing. The valve seat 8 appears here as a two-layered construction being partly a rigid steel layer and partly a less rigid surface coating, e.g., PTFE or other suitable surface coating with the appropriate material properties for the actual task.

FIG. 2 may furthermore be viewed in a different way where the figure shows a method step in which valve body 5 and the two valve seats 8 are arranged in a valve housing 2 immediately before it can be deformed as seen in FIG. 1. Both of the two views are relevant and a valve 1 according to the invention can, according to need or desire, be made in both ways. Irrespectively of whether it is the cutting action from the flange 10 that acts as the final fixing or as a temporary fixing before deformation of the connection ends 4, the valve body 5 and the valve seats 8 can easily and without any substantial effort be placed at the desired position where a sufficient contact pressure is established between the valve body 5 and the valve seat 8. Common to the solutions appearing in FIGS. 1 and 2 is that valve body as well as valve seats and associated packings can be mounted in the central part 3 of the valve housing through one or both of the connection ends 4. Therefore, there is no need for the valve housing 2 to be composed of several parts.

Figure 3:
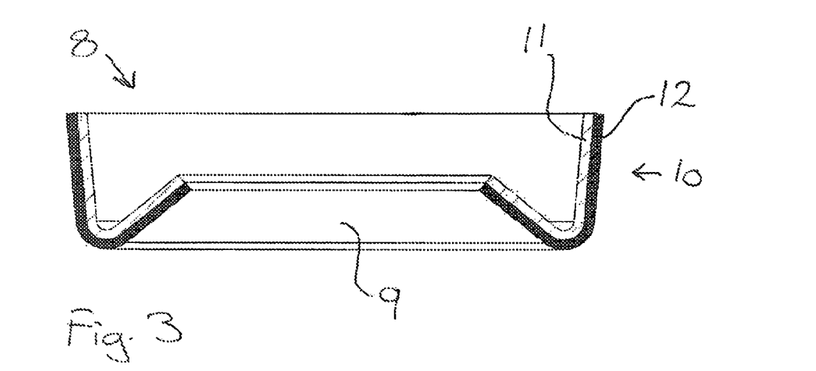
FIG. 3 shows a valve seat with conical fixing part.

In FIG. 3 shows a cross-section of a valve seat 8 with a conical fixing part corresponding to the flange part 10 and with the flange part 9 adapted for bearing against the valve body 5 itself. Furthermore, the previously mentioned two-layer construction is shown where one layer 11 is steel while the other layer 12 is a surface coating, e.g., PTFE or other suitable material. The steel layer 11 has the purpose of providing rigidity and resiliency to the valve seat 8 whereas the surface coating 12 has the purpose of sealing between valve body 5 and valve seat 8 and at the same time exert such a modest/low friction between the two parts 5, 8 that the valve 1 can be operated between a closed and an open position. The layer 11, which is here of steel, can, however, also be made of other materials, including metal, synthetics, fiber-reinforced composites or other suitable materials. The same goes for the layer 12 of surface coating material which can be entirely omitted or alternatively be made of any other suitable material. The thickness of the layer 11 and the layer 12 can be chosen according to need such that the required elasticity, friction or other suitable parameter is achieved.

Figure 4:
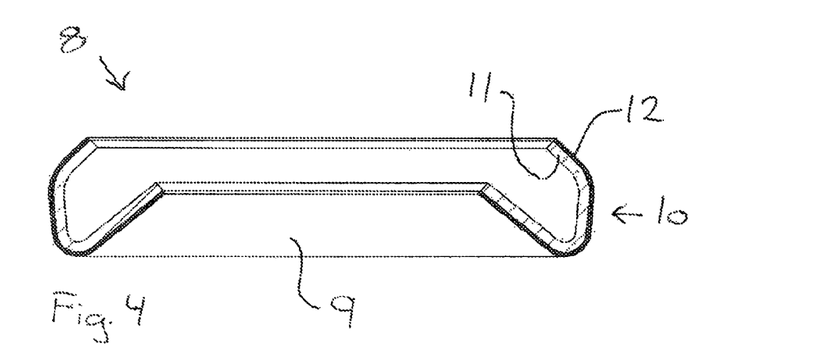
FIG. 4 shows a valve seat with deformed fixing part.

In FIG. 4 is also shown a cross-section of a valve seat 8 which is here shaped/deformed as shown in FIG. 1. This shaping may be performed before mounting in the valve housing 2 but may also occur during deformation of the valve housing 2 after positioning the valve body 5 and the valve seats 8. The coating 12 may furthermore be provided only on the part of the valve seat 8 that comes into contact with the valve body 5, which generally corresponds to the flange part 9.

Figure 5:
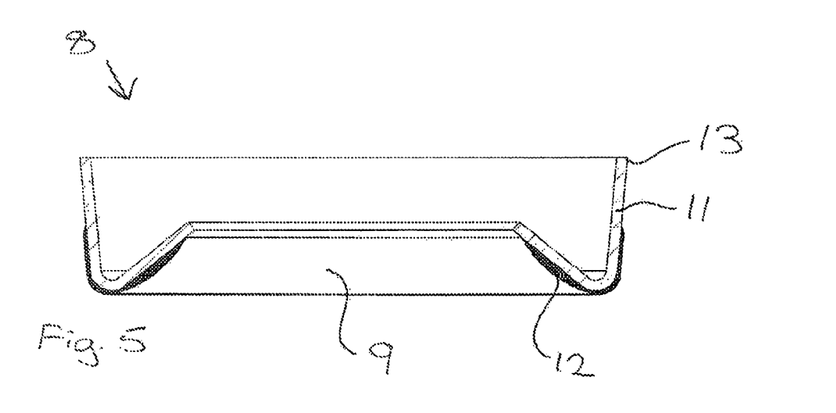
FIG. 5 shows a valve seat with a partial surface coating.

FIG. 5 also shows a cross-section of a valve seat 8 with a partial surface coating 12, thus letting part of the flange part 10 stand without coating 12. A better contact between the edge 13 on the flange part 10 and the internal side of the valve housing 2 can hereby be achieved, which is particularly advantageous in case that the valve seats are mounted and fixed by the edge 13 cutting into internal surface of the valve housing. The shape of the layer 12 can be varied and applied according to need, and in the illustrated example it can be seen that on the flange part 9 intended to face the valve body 5 there is arranged a coating 12 with a convex shape.

Figure 6:
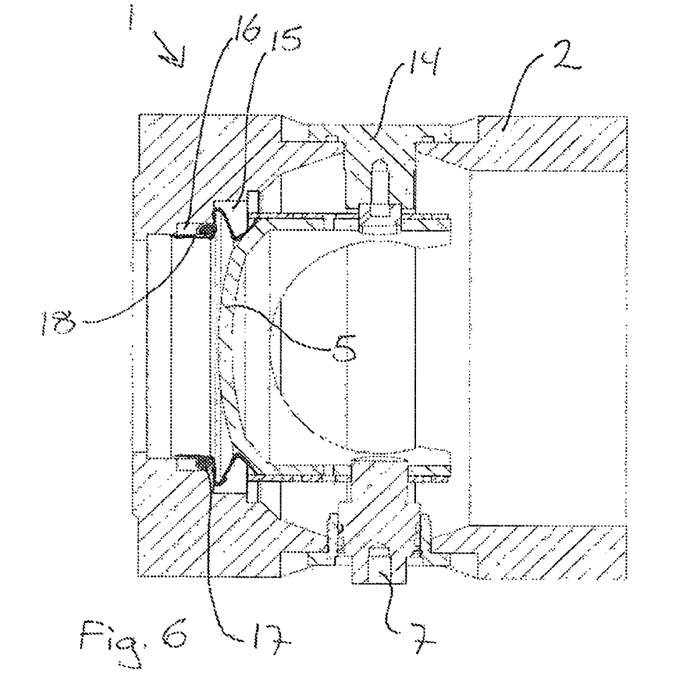
FIG. 6 shows a sectional drawing of a valve with only one valve seat.

FIG. 6 shows a cross-sectional drawing of a valve 1 with only one valve seat 8 where the valve body 5 is constituted by a part of a spherical shell which therefore is not a closed spherical valve body 5 as shown in FIGS. 1 and 2. The valve body 5 is here fitted with a valve spindle 7 but also with a control spindle 14 as shown at the top of the Figure. The valve seat 8 is also designed in a different way as it is fixed bearing against a recess 15 in the valve housing 2. The recess furthermore includes an additional recess 16 for a packing 17. The variant of a valve seat appearing in FIG. 6 is adapted with a cylindrical flange part 18 lying along the internal surface in the valve housing 2 and connected with a radial flange 19 which together with the cylindrical flange part 18 form a packing surface for contact with the packing 17. A conically inwardly facing flange 20 extends from the radial flange 19, the former connected with a conically outwardly facing flange part 9 adapted for bearing against the valve body.

By this variant of a valve 1 according to the invention, tolerances may thus be absorbed and/or a resilient action can be exerted against the valve body 25 from the flange part 9 but also from the conically inwardly facing flange 20 which together constitute a kind of elastic bellows.

Figure 7:
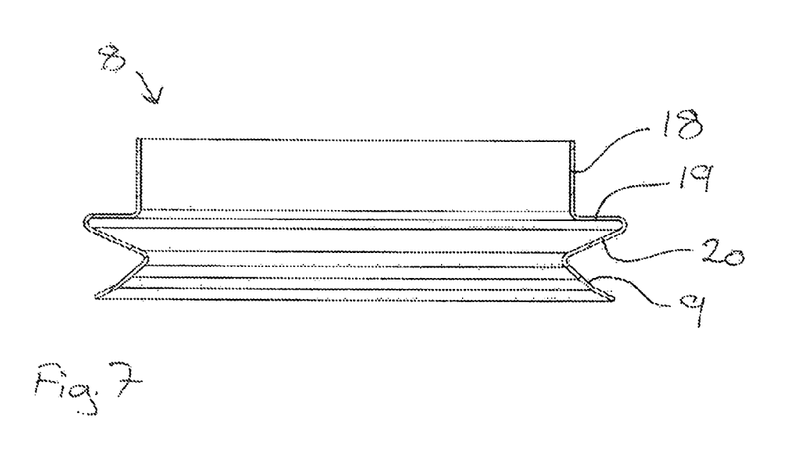
FIG. 7 shows a valve seat as seen in FIG. 6.

FIG. 7 shows a valve seat 8 as seen and described in the description of FIG. 6.

Figure 8:
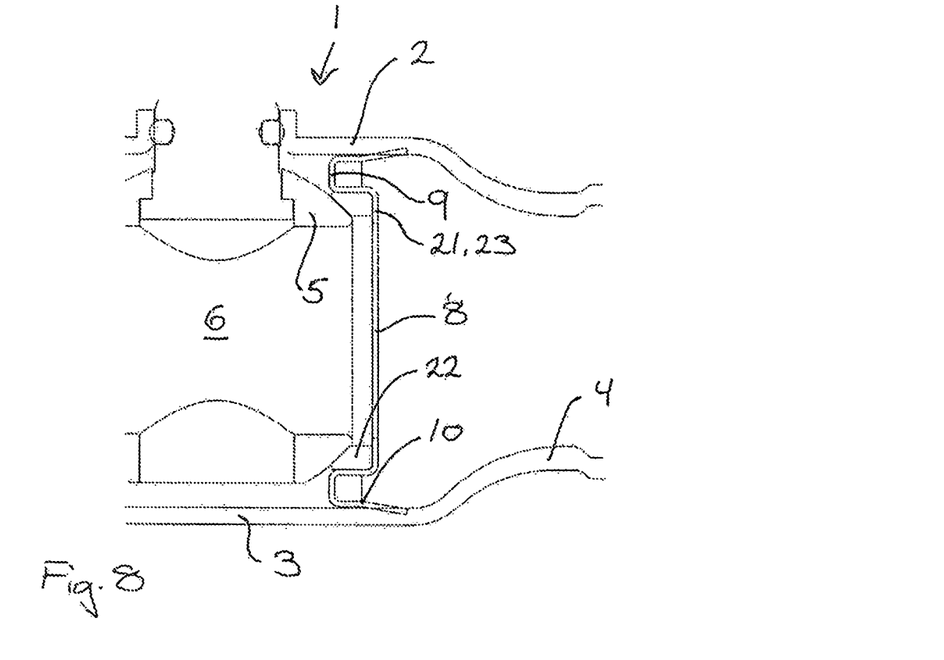
FIG. 8 shows a sectional drawing of a variant of a valve with spring-locked valve seat.

FIG. 8 shows a cross-sectional drawing of yet a variant of a valve 1 with spring-locked valve seat 8 wherein appears part of a valve housing 2 with a central part 3, with connection end 4 and with a valve body 5 bearing against a valve seat 8. As also shown in FIG. 2, the valve seat 8 is here only fixed by the flange part 10 being pressed against the internal side of the valve housing 2 whereby a locking occurs according to the same principle as by the various known push-in fittings. By the shown variant of a valve 1, after mounting valve body 5 and valve seat 8 the connection end 4 is deformed to a lesser diameter than the central part 3 without the flange part 10 against the internal side of the valve housing 2 being deformed. However, it will also be possible to fix a valve seat 8 as shown in this Figure in the same way as shown in FIG. 1 where deformation of the flange part 10 is performed.

However, there is the more significant difference between the valve seat 8 in this Figure and the one shown in FIG. 2 in that a recess 21, in which a valve seat packing 22 is arranged, is formed in the valve seat 8 on the flange part 9. In this variant of a valve 1, both the valve seat packing 22 itself and the flange part 9 act resiliently against valve body 5, but the valve seat packing 22 can in principle be very stiff in relation to the flange part 9 such that it is the flange part 9 that provides the required and desired resilient force against the valve body 5.

The valve seat packing 22 can be mounted with, e.g., glue for the flange part 9, it can be loose or it can be fixed by a kind of clamping into the structural part of the valve seat 8. For example, the flange part 9 can be designed with a cutout interacting with a corresponding projection on the valve seat packing 22 such that the two parts 8, 22 are entirely or partly fixed in relation to each other.

Figure 9:
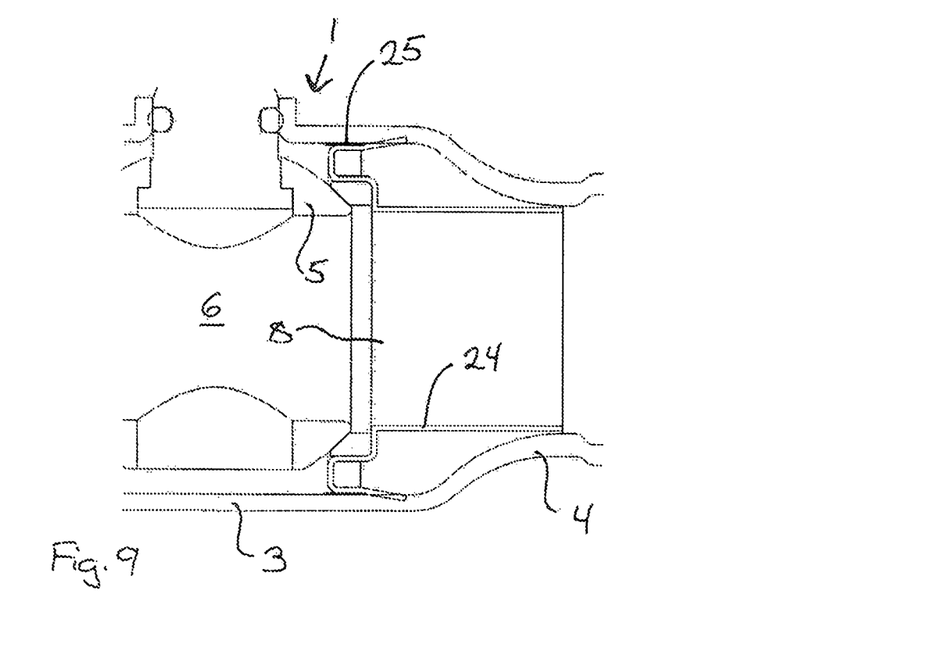
FIG. 9 shows yet a sectional drawing of a valve with tubular flange on a spring-locked valve seat.

FIG. 9 shows yet a sectional drawing of a valve 1 with spring-locked valve seat 8. In principle, this is a solution which is largely identical to the solution represented in FIG. 8. However, there is the difference that the valve seat 8 here includes a cylindrical tubular flange part 24 extending from the recess 21 on the flange part 9 in direction against the connection end 4. This cylindrical tubular flange part 24 provides for a markedly more uniform flow of the medium for which the valve 1 is used, as the medium, so to say, is guided by the direct path and does not flow so uncontrolledly in the area before and after valve body 6 and valve seats 8. FIG. 9 furthermore shows the use of glue 25, thereby ensuring tightness between valve housing 3 and valve seat 8.

The invention is not limited to the above described embodiments and not to the embodiments shown in the drawings either, but may be supplemented and modified in any way according to the invention as specified and defined in the claims.

What is claimed is:

1. A valve for regulating a fluid, the valve including a valve housing with a central part and with two connection ends, the connection ends extending away from the central part, thus indicating a flow direction for the fluid, wherein internally of the central part there is arranged a valve body including an at least partially spherical surface for contact against a corresponding valve seat, the valve body including at least a shutoff part and a through-flow part, wherein the valve seat is arranged in the valve housing and resiliently bearing against the valve body, the valve seat including a resilient structural part where the spring action from the resilient structural part acts in a direction which is parallel with the flow direction of the valve, and where the resilient structural part includes at least one annular flange part adapted for at least indirect bearing on the valve body, wherein the at least one resilient valve seat includes a fixing member for mechanical fixing of the valve seat in the valve housing, the fixing member being fixed in the valve housing by plastic deformation of at least one of the valve housing and the fixing member and, wherein the at least one resilient valve seat includes the fixing member for mechanical fixing of the valve seat in the valve housing, the fixing member with the flange part that is conical in a direction which is parallel with the flow direction, and wherein the flange part includes the annular part, said flange part includes an external edge, the edge constituting a barb for engaging the internal surface of the valve housing as the external diameter of the flange part is greater than the internal diameter of the valve housing at the area in which the valve seat is placed.

2. Valve according to claim 1, wherein the valve includes two oppositely directed resilient valve seats.

3. A valve according to claim 1, wherein the at least one resilient valve seat include the fixing member for mechanical fixing of the valve seat in the valve housing, the fixing member including means for disposition in a recess in the valve housing.

4. A valve according to claim 1, wherein the valve seat is made of resilient metal, wherein at least part of the valve seat, is coated with an elastomeric surface.

5. A valve according to claim 1, wherein the valve seat is made of resilient metal, wherein at least part of the valve seat, includes a contact surface for a valve seat or elastomer gasket.

6. A valve according to claim 1, wherein the valve seat includes a tubular second flange part with an internal cross-sectional area, the tubular second flange part extending away from the valve body and towards a connection end, where the internal cross-sectional area corresponds to the internal cross-sectional area of the through-going opening in the valve housing.

7. A valve according to claim 1, wherein the valve body and the at least one valve seat are fixed in the valve housing, the valve housing having said two connection ends, each with a diameter such that at least one connection end has a diameter corresponding to the diameter of at least one of the valve body and a valve seat.

8. A method for making a valve, the valve adapted for regulating a fluid, wherein the valve includes a valve housing with a central part and with two connection ends, the connection ends extending away from the central part, thus indicating a flow direction for the fluid, wherein internally of the central part there is arranged a valve body including an at least partially spherical surface for bearing against a corresponding valve seat, the valve body including at least a shutoff part and a through-flow part, wherein the making of the valve housing at least includes the following steps:

providing the valve housing with the central part;
arranging the valve body in the central part;
arranging and fixing the at least one valve seat in the central part and bearing against the valve body; the valve seat including a resilient structural part where spring action from the resilient structural part acts in a direction which is parallel with the flow direction of the valve, and where the resilient structural part includes at least one annular flange part adapted for at least indirect bearing on the valve body, wherein the at least one resilient valve seat includes a fixing member for mechanical fixing of the valve seat in the valve housing, the fixing member being fixed in the valve housing by plastic deformation of at least one of the valve housing and the fixing member; and fixing the valve seat by allowing the external edge of the flange part of the valve seat to engage the internal surface of the valve housing by barbing, as the external diameter of the flange part is greater than the internal diameter of the valve housing at the area in which the valve seat is placed and by means of said external edge of the flange constituting a barb for engaging the internal surface of the valve housing.

9. A method according to claim 8, wherein the method includes at least the additional following steps:
fixing of the at least one valve seat is effected by deformation of the valve housing, the deformation being made after arranging the valve seat in the central part.

10. A method according to claim 8, wherein the method includes at least the additional following steps: fixing of the at least one valve seat is effected by deformation of at least one flange part on the valve seat.

* * * * *